United States Patent [19]

Nishikawa et al.

[11] Patent Number: 4,529,755
[45] Date of Patent: Jul. 16, 1985

[54] EPOXY RESIN COMPOSITION FOR ENCAPSULATING SEMICONDUCTOR

[75] Inventors: Hiroshi Nishikawa; Ueki Saruta; Shin-ichiro Asai, all of Machida, Japan

[73] Assignee: Denki Kagaku Kogyo Kabushiki Kaisha, Tokyo, Japan

[21] Appl. No.: 544,242

[22] Filed: Oct. 21, 1983

[30] Foreign Application Priority Data

Oct. 23, 1982 [JP] Japan ............................ 57-186518
Jun. 17, 1983 [JP] Japan ............................ 58-107894

[51] Int. Cl.³ .................... C08K 3/34; C08K 9/06; C08K 3/00; H05K 5/00
[52] U.S. Cl. ...................... 523/436; 523/212; 523/467; 525/92; 174/52 PF
[58] Field of Search ....................... 525/92; 523/436

[56] References Cited

U.S. PATENT DOCUMENTS

| | | | |
|---|---|---|---|
| Re. 30,843 | 1/1982 | Flint | 428/323 |
| 3,723,223 | 3/1973 | Le Compte | 525/92 |
| 3,936,575 | 2/1976 | Watanabe et al. | 428/418 |
| 4,113,914 | 9/1978 | Doss | 428/355 |
| 4,120,913 | 10/1978 | Petrie | 525/482 |
| 4,133,796 | 1/1979 | Bullman | 523/437 |
| 4,294,733 | 10/1981 | Marzouki et al. | 428/34 |

*Primary Examiner*—Herbert J. Lilling
*Attorney, Agent, or Firm*—Stevens, Davis, Miller & Mosher

[57] ABSTRACT

An epoxy resin composition for encapsulating semiconductors and semiconductor elements is disclosed. This epoxy resin composition mainly comprises (a) a polyfunctional epoxy compound, (b) a styrene type block copolymer or styrene type block copolymer and liquid rubber, (c) a hardener for the epoxy compound and (d) an inorganic filler.

47 Claims, No Drawings

EPOXY RESIN COMPOSITION FOR ENCAPSULATING SEMICONDUCTOR

BACKGROUND OF THE INVENTION

This invention relates to an epoxy resin composition, particularly an epoxy resin composition for encapsulating semiconductors and semiconductor elements such as diode, transistor, IC, and LSI elements, which composition is superior in low strain stress, high resistance to thermal shock and high-temperature properties.

In the field of electronic parts today, it is desirable to provide miniaturized, light-weight parts and multifunctional parts by providing the elements in high density, large-size and combinations of the elements. In such electronic parts, particularly semiconductors, there has been widely employed an encapsulating process using encapsulating resins. Various improvements of such encapsulating resins have been demanded.

Conventionally, as the semiconductor encapsulating resin, there have been employed materials such as epoxy, silicon, phenol, diallyl phthalate and the like. Among such materials, the epoxy resin molding material using the phenol type novolak resin as a hardener is superior to other encapsulating resins in points of having in combination adherability to the material to be encapsulated and electrical properties, and have been used extensively.

A transfer molding process is generally used for resin encapsulation of the semiconductor elements. However, in such a process, the difference in the coefficient of thermal expansion between the elements made of inorganic materials and the resin is so tolerable that it has a drawback that a high strain stress occurs when a sudden change in the temperature takes place during or after the molding process. The conventional epoxy resin type molding material has particularly suffered a large strain stress, and when it is directly molded without applying a flexible protective coat to large element dice, the element dice suffer cracks and/or the bonding wires break. Recently, ultra-thin, resin-encapsulated semiconductors which are small and light-weight have suffered from the defect that the encapsulating resin itself cracks due to the strain stress and loses its encapsulation function. To remedy such defects, the development of resins which have a small strain stress and which do not form cracks has been desired. As a method to reduce the strain stress of the encapsulating resin, there are (1) a method of lowering the coefficient of thermal expansion of resin to nearly that of the inorganic materials, and (2) a method of lowering the elastic coefficient.

The above method (1) is generally carried out by adding to the resin an inorganic filler having a low coefficient of thermal expansion. By this method, the encapsulating resin can be lowered in the coefficient of linear expansion but its elastic coefficient increases. Therefore, the lowering of the strain stress is not sufficient. The above method (2) is conducted by adding to the resin a flexibility imparting agent. Conventionally, there have been used as the flexibility imparting agent diglycidyl ether of bisphenol A having a long side chain and bisepoxy of a long chain, such as polypropylene glycol diglycidyl ether, and recently there have been used reactive liquid rubbers such as low-molecular-weight polybutadiene having on the ends carboxyl group, amino group, etc., and their copolymers. However, when such flexibility imparting agents are added until the strain stress is sufficiently decreased, there are caused drawbacks, such as lowering of the mechanical-strength and the glass transition point. As a result, the thermal shock properties and the high-temperature properties are greatly affected.

SUMMARY OF THE INVENTION

This invention relates to an epoxy resin composition for encapsulating semiconductor elements.

The epoxy resin composition of the present invention mainly consists of (a) a polyfunctional epoxy compound, (b) a styrene type block copolymer or styrene type block copolymer and liquid rubber, (c) a hardener for the epoxy compound and (d) an inorganic filler.

The present epoxy resin composition is superior in low strain stress, high resistance to thermal shock, high glass transition temperature and high-temperature properties, and it is quite useful as the resin composition for encapsulating semiconductor elements such as diode, transistor, IC, LSI, etc.

DETAILED DESCRIPTION OF THE INVENTION

This invention aims to provide an epoxy resin composition for encapsulating semiconductors, which composition is superior in low strain stress, high resistance to thermal shock, high glass transition temperature and high-temperature properties.

Namely, the present invention concerns an epoxy resin composition for encapsulating semiconductors mainly comprising:

(a) a polyfunctional epoxy compound, (b) a styrene type block copolymer or styrene type block copolymer and liquid rubber, (c) a hardener for the epoxy compound, and (d) an inorganic filler.

In the present invention, examples of the polyfunctional epoxy compound (a) above include glycidyl ether type epoxy resin such as bisphenol A type epoxy resin, phenolic novolak type epoxy resin and cresol novolak epoxy resin, glycidyl ester type epoxy resin, glycidyl amine type epoxy resin, linear aliphatic epoxy resin, alicyclic epoxy resin, heterocyclic epoxy resin and halogenated epoxy resin, which epoxy compound possesses at least two epoxy groups in one molecule. The epoxy compound may be used alone or in a combination that includes at least two compounds. Taking the corrosion resistance into consideration, the chlorine ion content is desired to be not more than 10 ppm and the hydrolyzable chlorine content is desired to be not more than 0.1% by weight.

The component (b) above contains a rubbery substance and comprises a styrene type block copolymer or styrene type block copolymer and liquid rubber.

The styrene type block copolymer (hereinafter referred to as the block copolymer) is an essential component in order to obtain a molded article having the desired low stress. This block copolymer comprises chains of styrene type polymer such as styrene, α-methylstyrene, vinyltoluene, divinylbenzene and t-butylstyrene, and aliphatic polymer block, such as olefinic compound polymer block, for example, butadiene, isoprene, etc. or etylene-butylene polymer block prepared by hydrogenation of the olefinic compound polymer block. The block copolymer may have a taper structure in the chains. Examples of the block copolymer include linear-block copolymer, star-block copolymer and double star-block copolymer, and expressed, for example, as $(A-B)_nA$, $(A-B)_n$, $(A-B)_nX$, $(A-B)_nXA_m$ (wherein, n, m: integral number; A: polymer block possessing benzene nuclues such as styrene, α-methyl styrene, vinylbenzene, etc.; B: aliphatic polymer block such as butadiene, isoprene, etc. or ethylene-butylene polymer block hydrogenated therewith; and X: coupling agent unit for mutually coupling block chains), but such morphology is not restricted. Besides, the block copolymer can be used alone or in a combinatin that includes at least two members.

The content of aliphatic polymer block of the block copolymer is desired to be in the range of 10 to 90% by weight, more preferably in the range of 50 to 90% by weight. If the content is less than 10% by weight, the effects of lowering the strain stress and of improving the high resistance to thermal shock are not expected, and when the content exceeds 90% by weight, the compatibility with the epoxy resin is deteriorated, and the moldability and mechanical properties become inferior.

The block copolymer is desired to be added in the range of 2 to 20 parts by weight, more preferably in the range of 5 to 15 parts by weight to 100 parts by weight of the polyfunctional epoxy compound (a). When the block copolymer is added in an amount of less than 2 parts by weight, the positive effect of the block copolymer is not expected and reduction of the strain stress and improvement of high resistance to thermal shock are not sufficiently obtained. When the addition exceeds 20 parts by weight, fluidity is lowered, entrainment of air is increased, bleeding appears on the surface of the molded material, and the encapsulated content flows out; as a result, the moldability is defective. The aforementioned block copolymer specifically includes those of Shell International Chemical Company (Cariflex TR, Kraton G), Asahi Kasei Kogyo Kabushiki Kaisha (Tufprene), Phillips Petroleum Company (K Resin and Solprene-T) and Denki Kagaku Kogyo Kabushiki Kaisha (CLEAREN).

Examples of the liquid rubber include various liquid rubbers, for example, butadiene type low-molecular-weight polymer such as low-molecular-weight 1,2-polybutadiene, 1,3-polybutadiene, 1,4-polybutadiene, butadiene-styrene copolymer and butadiene-acrylonitrile copolymer, isoprene type low-molecular-weight polymer such as low-molecular-weight polyisoprene and low-molecular-weight depolymerized rubber of natural rubber, liquid chloroprene rubber, liquid silicone rubber and liquid polysulfide rubber. Such rubbers may be used alone or in a combination that includes at least two types. These liquid rubbers are desired to possess on their ends at least one reactive group selected from the group consisting of an epoxy group, hydroxyl group, amino group, thiol group, carboxyl group and vinyl group.

The liquid rubber is desired to be added in the range of 2 to 30 parts by weight, more preferably in the range of 5 to 20 parts by weight to 100 parts by weight of the polyfunctional epoxy compound (a). When the amount of the liquid rubber is less than 2 parts by weight, lowering of the strain stress and improvement of the high resistance to thermal shock can not be expected. The addition of more than 30 parts by weight of the liquid rubber causes degradation of fluidity, occurrence of a large number of voids in the molded article and formation of bleeding on the surface of the molded article; as a result, the moldability is defective. In addition, as other drawbacks it has been found that the mechanical strength of the molded article is lowered, the adherability to the inorganic materials is becomes inferior and the humidity resistance of the encapsulated semiconductor deteriorates.

In the present invention, the total amount of the styrene type block copolymer (b) and the liquid rubber in the component is desired to be in the range of from 5 to 40 parts by weight against 100 parts by weight of the polyfunctional epoxy compound (a).

Examples of the hardener (c) for the epoxy compound of the present invention include phenolic resin, polyhydric phenolic compound, acid anhydrides, amines and polysulfide resin. More specifically, examples of the phenolic resin include novolak type phenolic resins such as phenolic novolak resin, cresol novolak resin, tertbutylphenolic novolak resin, and examples of the polyhydric phenolic compound include resol type phenolic resin and bisphenol A. Examples of the acid anhydrides include phthalic anhydride, hexahydrophthalic anhydride, tetrahydrophthalic anhydride, pyromellitic anhydride, dodecylsuccinic anhydride. Examples of the amines include diethylenetriamine, triethylenetetramine, diethylaminopropylamine, N-aminoethyl piperazine, methaxylene diamine, and 3,9-bis(3-aminopropyl)-2,4,8,10-tetraoxaspyro(5,5)undecane.

Among the above hardeners, the novolak type phenolic resin is most preferable as the hardener for the epoxy compound. The softening point of this resin is in the range of from 60° to 100° C., and the water soluble component contained therein is desired to be not more than 3% by weight at normal temperature in view of the toxicity of the molding material and the humidity resistance of the hardened article.

The amount of the hardener for the epoxy compound is determined depending upon the compounding ratio of the polyfunctional epoxy compound (a) and the hardener (c) for the epoxy compound. Specifically, it is desired to be the amount (part by weight) needed to make the ratio of the number of active group such as phenolic hydroxyl group, acid anhydride and amino group within the hardener (c) for the epoxy compound to the number of the epoxy group of the polyfunctional epoxy compound (a) [i.e., number of the active group of (c)/number of epoxy group of (a)] to be in the range of 0.5–1.5, more preferably in the range of 0.8–1.2. When this ratio is less than 0.5, the hardening does not proceed smoothly, thereby causing the molding to be impossible to carry out, and the mechanical properties and electrical properties are deteriorated. When the ratio exceeds 1.5, high resistance to thermal shock and humidity resistance of the encapsulated semiconductor are degraded causing the hardening to be inferior; as a result the moldability is also deteriorated.

The last one of the essential components of the present invention, the inorganic filler (d) is selected from the group consisting of zirconium oxide, alpha quartz, molten silica, clay, alumina, aluminum hydroxide, calcium carbonate, glass, asbestos, whisker, gypsum, magnesite, mica, kaoline, talc, graphite, cement, iron carbonyl, ferrite, molybdenum disulfide, zinc white, titanium white, carbon black, quartz sand, and wallastonite. The above component may be employed alone or in a combination that includes at least two members of the above group.

The inorganic filler is desired to be added in an amount ranging from 60 to 80% by weight against the total amount of the whole components added. When the amount added is less than 60% by weight, the coefficient of thermal expansion increases causing cracks in the resin and dice. When the amount exceeds 80% by weight, the fluidity of the material is markedly deteriorated making the molding process impossible to carry out.

In the production of the epoxy resin composition for encapsulating semiconductors of the present invention, various catalysts may be added as the hardening promotor to accelerate the hardening reaction of the polyfunctional epoxy compound at a prescribed temperature. Examples of such catalysts include imidazoles such as imidazole, 2-methylimidazole, 2-ethylimidazole, 1,2-methylimidazole, 2-ethyl-4-methylimidazole, 2-undecylic imidazole, 2-phenyl imidazole; amine type compounds such as triethylamine, diethylenetriamine, triethylenetetramine, N-amino-ethyl piperazine, methaxylene diamine, 3,9-bis(3-aminopropyl)-2,4, 8,10-tetraoxaspiro(5,5)undecan, complex compound composed of triethylamine and $BF_3$; organic phosphine compounds such as triphenyl phosphine, tributyl phosphine, methyl diphenyl phosphine, butyl phenyl phosphine, dimethyl phosphine, phenyl phosphine, octyl phosphine; and thiazoles. These catalysts may be used alone or in a combination that includes at least two members.

The hardening promotor is desired to be added in an amount ranging from 0.01 to 20 parts by weight, more preferably from 0.01 to 5 parts by weight against 100 parts by weight of the polyfunctional epoxy compound (a). When the added amount is less than 0.01 part by weight, the hardening proceeds very slowly, and when it exceeds 20 parts by weight, the humidity resistance becomes inferior.

Depending upon the purpose for which the product of the invention is used, there may be suitably added a parting agent, colorant, flame retarder, or silane coupling agent. The parting agent is selected from natural waxes, synthetic waxes, straight-chain fatty acid and its metallic salt, acid amides, esters and paraffin. The flame retarder is selected from brominated epoxy resin, chlorinated paraffin, bromtoluene, hexabrombenzene, and antimony trioxide. The colorant is selected from carbon black, more specifically acetylene black and furnace black.

The epoxy resin composition for encapsulating semiconductors of the present invention is prepared by uniformly kneading the necessary components by means of a mixing device such as rolls, kneader and the like. The procedure utilized for the mixing process is not specifically limited so long as each component is uniformly mixed.

As described above, the composition of the present invention is prepared by uniformly mixing, a polyfunctional epoxy compound, (b) a styrene type block copolymer, (c) a hardener for the epoxy compound, and (d) an inorganic filler; or the main components: (a) a polyfunctional epoxy compound, (b) a styrene type block copolymer and liquid rubber, (c) a hardener for the epoxy compound and (d) an inorganic filler, so that the composition may be utilized for preparation of molded articles and possesses a small strain stress, suffers no decrease of the glass transition temperature, and is superior in mechanical strength and moldability. Therefore, when the composition is used to encapsulate semiconductor elements, it does not cause cracks in the dice and provides remarkable effects on high resistance to thermal shock and humidity resistance properties.

The invention will be understood more readily by reference to the following examples; however, these examples are intended to illustrate the invention and are not to be construed to limit the scope of the invention.

EXAMPLES 1-5

To a composition consisting of 170 parts by weight of cresol novolak epoxy resin containing 220 equivalents of epoxy, 30 parts by weight of brominated novolak epoxy resin containing 280 equivalents of epoxy, 100 parts by weight of phenolic novolak resin, 4 parts by weight of 2-undecylic imidazole, 5 parts by weight of carnauba wax, 6 parts by weight of silane coupling agent ($\gamma$-glycidoxypropyltrimetoxysilane), 2 parts by weight of carbon black, 20 parts by weight of anitimony trioxide and 700 parts by weight of molten silica; a styrene type block copolymer in the amount (part by weight) and components as shown in Table 1 was added to 200 parts by weight of the epoxy resin, mixed in a mixer, then kneaded with heating rolls. The kneaded material was cooled down and pulverized to prepare the molding material.

Using each molding material thus prepared, transfer molding was conducted to prepare samples for curing tests to evaluate various properties.

(1) Stress was measured by the steel ring method which was conducted by the following procedure. On the inner surface of an iron cylinder (20 mm diameter, 1 mm thick, and 20 mm high), the strain gauge was applied and the outer surface of the cylinder was applied with resin of 10 mm thickness for resin molding at 170° C. After cooling, the stress which occurred in the circumferential direction at 25° C. was determined from the deformation degree of the iron cylinder. The results are shown in Table 1.

The hardened article obtained from the epoxy resin composition prepared by addition of styrene type block copolymer was found to possess a stress much smaller than those obtained from the composition prepared without the addition of the block copolymer and those from the epoxy resin composition added with butadiene type low-molecular-weight polymer.

(2) The above molding materials were molded with 16-pin IC lead frame possessing an island size of 4×6 mm. The molded article obtained was subjected to the thermal shock test, which test alternately dipped the molded article in a liquid of −196° C. and a liquid of +260° C. for 30 seconds each. The results are shown in Table 2, wherein the number of IC chips which suffered cracks per the total number of 10 IC chips is shown by percentage. As obvious from the table, the composition prepared by addition of the styrene type block copolymer according to the present invention was remarkably improved in high resistance to thermal shock.

COMPARATIVE EXAMPLES 1-5

The same procedure as in Examples 1-5 was conducted to determine various properties of epoxy resin compositions prepared without addition of the styrene type block copolymer and those prepared with addition of the butadiene type low-molecular-weight copolymer. The results are shown in Tables 1 and 2.

TABLE 1

| | | Example | | | | | Comparative Example | | | | |
|---|---|---|---|---|---|---|---|---|---|---|---|
| | | 1 | 2 | 3 | 4 | 5 | 1 | 2 | 3 | 4 | 5 |
| Component | Styrene type block copolymer (1) | 10 | 20 | | | | | | | | |
| | Styrene type block copolymer (2) | | | 10 | | | | | | | |
| | Styrene type block copolymer (3) | | | | 10 | 20 | | | | | |
| | Butadiene type low-molecular-weight polymer (1) | | | | | | 10 | 20 | | | |
| | Butadiene type low-molecular-weight polymer (2) | | | | | | | | 10 | | |
| | Butadiene type low-molecular-weight polymer (3) | | | | | | | | | 10 | |
| Property | Spiral flow (inch) | 33 | 30 | 35 | 35 | 32 | 36 | 37 | 35 | 35 | 35 |
| | Glass transition temp. (°C.) | 160 | 161 | 159 | 158 | 160 | 146 | 124 | 152 | 150 | 160 |
| | Bending modulus of elasticity × $10^3$ (Kg/mm$^2$) | 1.2 | 0.95 | 1.1 | 1.1 | 0.9 | 1.5 | 1.3 | 1.65 | 1.5 | 1.65 |
| | Stress (Kg/mm$^2$) | 0.50 | 0.32 | 0.43 | 0.40 | 0.25 | 0.71 | 0.66 | 0.81 | 0.73 | 0.82 |

Types of the components in Table 1 are as shown below.

Styrene type block copolymer (1):
  Styrene-butadiene block copolymer (butadiene content 72% by weight) made by Shell International Chemical Company, trade name Cariflex TR-1102

Styrene type block copolymer (2):
  Styrene-isoprene block copolymer (isoprene content 86% by weight) made by Shell International Chemical Company, trade name Cariflex TR-1107

Styrene type block copolymer (3):
  Styrene-ethylene butylene block copolymer (ethylenebutylene content 86% by weight) made by Shell International Chemical Company, trade name Kraton G 1657

Butadiene type low-molecular-weight polymer (1):
  1,2-polybutadiene dicarbonic acid made by Nippon Soda Kogyo Co., Ltd., trade name NISSO-pB-C-1000

Butadiene type low-molecular-weight polymer (2):
  Epoxidized polybutadiene made by Idemitsu Petrochemical Co., Ltd., trade name Poly Bd-R-45EPI Butadiene type low-molecular-weight polymer (3):
  Butadiene-acrylonitrile copolymer made by B. F. Goodrich, trade name Hycar CTBN 1300×13

TABLE 2

| Thermal cycling (number) | Ratio of cracks (%) | | | | | | | | | |
|---|---|---|---|---|---|---|---|---|---|---|
| | Example | | | | | Comparative Example | | | | |
| | 1 | 2 | 3 | 4 | 5 | 1 | 2 | 3 | 4 | 5 |
| 25 | 0 | 0 | 0 | 0 | 0 | 0 | 0 | 0 | 0 | 20 |
| 50 | 0 | 0 | 0 | 0 | 0 | 0 | 0 | 40 | 10 | 50 |
| 75 | 0 | 0 | 0 | 0 | 0 | 50 | 10 | 100 | 70 | 100 |
| 100 | 0 | 0 | 0 | 0 | 0 | 100 | 60 | | 100 | |
| 150 | 20 | 0 | 10 | 0 | 0 | | 100 | | | |
| 200 | 30 | 0 | 30 | 10 | 0 | | | | | |

In Examples 1–5 and Comparative Examples 1–5, properties were determined in accordance with the following:
 (1) Spiral flow: EMMI-1-66
 (2) Glass transition temperature: Point of inflection of the coefficient of linear expansion
 (3) Bending modulus of elasticity: JIS-K6911

EXAMPLES 6–8, COMPARATIVE EXAMPLES 6–8

To a composition consisting of 85 parts by weight of cresol novolak epoxy resin containing 220 equivalents of epoxy (made by Nippon Kayaku K.K., trade name EOCN 103S), 15 parts by weight of brominated novolak epoxy resin containing 280 equivalents of epoxy (made by Nippon Kayaku K.K., trade name BRENS), 50 parts by weight of phenolic novolak resin (Gun-ei Kagaku, K.K.), 2 parts by weight of 2-undecylimidazole, 2 parts by weight of carnauba wax, 3 parts by weight of γ-glycidoxypropyltrimetoxysilane, 1 part by weight of carbon black, 10 parts by weight of antimony trioxide, and molten silica (made by Denki Kagaku Kogyo K.K., trade name Denka Molten Silica FS-90) of 414 parts by weight (Examples 6–8 and Comparative Examples 6–7) and 374 parts by weight (Comparative Example 8); a styrene type block copolymer and liquid rubber in the ratio (part by weight) shown in Table 3 were added per 100 parts by weight of the epoxy resin and mixed in a mixer. The mixture was then kneaded with heating rolls, cooled down and pulverized to prepare the molding resin composition.

The properties of the epoxy resin compositions obtained in the above Examples 6–8 and Comparative Examples 6–8 are shown in Table 3.

Each property shown in Table 3 was determined according to the following methods:

Spiral flow:
 This property was measured according to EMMI-1-66, under the conditions of temperature 175° C., pressure 70 Kg/cm$^2$ and time 2 minutes.

Appearance of molded article:
 This property was determined by observing the surface condition of the hardened article immediately after the transfer molding under the conditions of temperature 175° C., pressure 70 Kg/cm$^2$ and time 2 minutes.

Stress:
 This property was measured by setting piezoresistance element (made by forming on the semiconductor chip the piezoresistance which varies its resistance depending on the stress) on a 16-pin DIP type IC frame, conducting transfer molding of each composition under the conditions of temperature 175° C., pressure 70 Kg/cm$^2$ and time 2 minutes, after-curing it for the lapse of 4 hours at 170° C. and allowing the product to be cooled. Then the strain stress of the element was determined.

High resistance to thermal shock:
 16-pin IC lead frame having an island size of 4×7.5 mm was subjected to the transfer molding using each composition under the conditions of temperature 175° C., pressure 70 Kg/cm$^2$, and time 2 minutes. The molded article was alternately dipped in a liquid of −196° C. and a liquid of +260° C. for 30 seconds each to observe the ratio of crack occurrence on the surface of the molded article. The ratio of crack occurrence shows the number of chips which suffered cracks to the total of 10 IC chips by percentage.

Humidity resistance of encapsulated semiconductor:

Silicone chip set up with aluminum wire was set on a 16-pin DIP type IC frame, then subjected to the coat molding treatment using each composition by the transfer molding method under the conditions of temperature 175° C. and time 2 minutes to prepare the molded article for testing. Thus, the prepared molded article was tested for the humidity resistance (PCT) to observe corrosion of the aluminum wire contained in the molded article in steam of 100% at 121° C. and the humidity resistance (Bias PCT) to observe corrosion of the aluminum wire applied with 20 V (DC) of voltage under the same conditions. Thus, the humidity resistance and corrosion resistance were determined. In Table 3, the ratio of the number of defective products to the total of 100 molded articles is shown as the percent defective.

corrosion resistance to those prepared from the epoxy resin composition with the liquid rubber or without such addition.

EXAMPLES 9–12, COMPARATIVE EXAMPLES 9–12

Into a vessel provided with a mixing device were placed cresol novolak epoxy resin containing 220 equivalents of epoxy (made by Nippon Kayaku K. K., trade name EOCN 103S), brominated novolak epoxy resin containing 280 equivalents of epoxy (Nippon Kayaku K. K., trade name BRENS) and liquid rubber in the ratio shown in Table 4 and melt mixed therein at 150° C. for three hours to fully disperse the liquid rubber into the epoxy resin. The rubber-dispersed epoxy resin D was removed from the vessel one hour after the stirring and cooled to use because it had gellatinized one hour after the stirring and further stirring became impossible to perform.

TABLE 4

|  | Proportion (weight ratio) | | | | |
|---|---|---|---|---|---|
| Cresol novolak epoxy resin | 85 | 85 | 85 | 85 | 85 |
| Brominated novolak epoxy resin | 15 | 15 | 15 | 15 | 15 |
| Liquid rubber (3) | 5 | 10 | 20 | 30 | 0 |
| Rubber-dispersed epoxy resin | A | B | C | D | E |

TABLE 3

| | | Example | | | Comparative Example | | |
|---|---|---|---|---|---|---|---|
| | | 6 | 7 | 8 | 6 | 7 | 8 |
| Component | Styrene type block copolymer (4) | 10 | 10 | | | | |
| | Styrene type block copolymer (5) | | | 10 | | | |
| | Liquid rubber (1) | 10 | | 10 | 20 | | |
| | Liquid rubber (2) | | 10 | | | 20 | |
| Property | Spiral flow (inch) | 31 | 32 | 30 | 33 | 36 | 32 |
| | Appearance of molded article | Good | Good | Good | Good | Bad | Good |
| | Stress (kg/mm²) | 25.2 | 23.9 | 25.5 | 26.0 | 26.1 | 34.0 |
| High resistance to thermal shock | 10 (cycle) | 0 | 0 | 0 | 0 | 20 | 40 |
| | 50 | 0 | 0 | 0 | 10 | 100 | 100 |
| | 100 | 10 | 0 | 0 | 100 | — | — |
| PCT | 500 (hr) | 0 | 0 | 0 | 20 | 10 | 0 |
| | 1000 | 0 | 3 | 0 | 100 | 60 | 15 |
| | 2000 | 0 | 20 | 1 | — | 100 | 70 |
| Bias PCT | 40 (hr) | 0 | 0 | 0 | 30 | 10 | 7 |
| | 80 | 7 | 0 | 0 | 70 | 57 | 50 |
| | 120 | 20 | 0 | 3 | 100 | 91 | 81 |
| | 200 | 50 | 3 | 15 | — | 100 | 100 |

In Table 3,

Styrene type block copolymer (4):
  Styrene-butadiene block copolymer (butadiene content 70% by weight) made by Denki Kagaku Kogyo K. K., trade name Denka STR-1702

Styrene type block copolymer (5):
  Styrene-ethylene butylene block copolymer (ethylene-butylene content 86% by weight) made by Shell International Chemical Company, trade name Kraton G 1657

Liquid rubber (1):
  End carboxyl butadiene-acrylonitrile copolymer (acrylonitrile content 18 mol%) made by B. F. Goodrich, trade name Hycar CTBN #1300×8

Liquid rubber (2):
  End epoxidized 1,4-polybutadiene made by Idemitsu Petrochemical Co., Ltd., trade name Poly bd-R-45 EPT The molded article obtained from the epoxy resin composition prepared by adding styrene type block copolymer and liquid rubber is superior in stress, high resistance to thermal shock, humidity resistance and Wherein, the liquid rubber (3) is end carboxyl 1,2-polybutadiene made by Nippon Soda K. K., trade name NISSO-PB-C-1000

To a composition prepared by adding to each rubber-dispersed epoxy resin described above 50 parts by weight of phenolic novolak resin, 1 part by weight of triphenylphosphine, 2 parts by weight of carnauba wax, 3 parts by weight of γ-glycidoxypropyltrimetoxysilane, 1 part by weight of carbon black, 10 parts by weight of antimony trioxide and molten silica (made by Denki Kagaku Kogyo K.K., trade name Denka Molten Silica, FS-90) of 405 parts by weight (Example 9), 416 parts by weight (Example 10), 438 parts by weight (Examples 11, 12), 438 parts by weight (Comparative Examples 9, 12), 372 parts by weight (Comparative Example 10), and 394 parts by weight (Comparative Example 11) per 100 parts by weight of the epoxy resin content of the rubber-dispersed epoxy resin was added the styrene type block copolymer in the amount (part by weight)

shown in Table 5 and powder mixed in a mixer. The mixture was then kneaded with heating rolls, cooled and pulverized to prepare the composition.

The properties of the epoxy resin compositions prepared in the above Examples 9-12 and Comparative Examples 9-12 are shown in Table 5. The properties were determined according to the methods used in Table 3.

TABLE 5

| | | Example | | | | Comparative Example | | | |
|---|---|---|---|---|---|---|---|---|---|
| | | 9 | 10 | 11 | 12 | 9 | 10 | 11 | 12 |
| Component | Rubber dispersed epoxy resin | A | B | B | C | D | E | E | E |
| | Styrene type block copolymer (4) | 10 | 10 | 20 | 10 | 0 | 0 | 10 | 30 |
| Property | Spiral flow (inch) | 31 | 31 | 27 | 30 | 20 | 32 | 31 | 23 |
| | Appearance of molded article | Good | Good | Good | Good | Bad | Good | Good | Bad |
| | Stress (kg/mm$^2$) | 28.5 | 22.7 | 19.7 | 16.1 | 13.5 | 34.5 | 29.2 | 24.0 |
| High resistance to thermal shock | 10 (Cycle) | 0 | 0 | 0 | 0 | 0 | 10 | 0 | 0 |
| | 50 | 0 | 0 | 0 | 0 | 10 | 100 | 90 | 0 |
| | 100 | 80 | 10 | 0 | 0 | 100 | — | 100 | 0 |
| PCT | 500 (hr) | 0 | 0 | 0 | 0 | 53 | 0 | 0 | 30 |
| | 1000 | 50 | 0 | 0 | 0 | 100 | 15 | 30 | 85 |
| | 2000 | 89 | 10 | 10 | 15 | — | 72 | 91 | 100 |
| Bias PCT | 50 (hr) | 0 | 0 | 0 | 0 | 60 | 10 | 0 | 0 |
| | 100 | 10 | 0 | 0 | 0 | 100 | 65 | 51 | 70 |
| | 150 | 63 | 3 | 0 | 1 | — | 100 | 87 | 100 |

As obvious from the above Examples and Comparative Examples, the epoxy resin composition of the present invention has remarkable properties for encapsulation of semiconductors.

REFERENCE EXAMPLE

The epoxy resin compositions obtained in Examples 6-8 and Comparative Examples 6-8 were subjected to the stress measurement by the steel ring method. The results are shown in Table 6.

TABLE 6

| | Example | | | Comparative Example | | |
|---|---|---|---|---|---|---|
| | 6 | 7 | 8 | 6 | 7 | 8 |
| Stress (kg/mm$^2$) | 0.35 | 0.34 | 0.34 | 0.65 | 0.66 | 0.82 |

As a method for measuring the strain stress, the method of the present invention using a piezoresistance element is superior to the steel ring method since the measurement is conducted through a molding process which is identical with the semiconductor encapsulation, and the strain stress measured is very near to the actual stress which occured.

What is claimed is:

1. An epoxy resin composition for encapsulating semiconductors, comprising:
    (a) 100 parts by weight of at least one glycidyl ether epoxy resin selected from the group consisting of phenolic novolak epoxy resin and cresol novolak epoxy resin;
    (b) 2-20 parts by weight of at least one styrene block copolymer selected from the group consisting of block copolymers formed from styrene polymer and aliphatic polymer block;
    (c) 2-30 parts by weight of at least one liquid rubber selected from the group consisting of low molecular weight butadiene polymer, low molecular weight isoprene polymer, liquid chloroprene rubber, liquid silicone rubber and liquid polysulfide rubber;
    (d) an amount of at least one hardener selected from the group consisting of phenolic resins, polyhydric phenolic compounds, acid anhydrides and polysulfide resins sufficient to make the ratio of the number of active groups of the at least one hardener to the number of epoxy groups of the at least one glycidyl ether epoxy resin be in the range of 0.5-1.5; and
    (e) 60-80% by weight, based on the total weight of the composition, of at least one inorganic filler.

2. The epoxy resin composition according to claim 1, wherein the at least one glycidyl ether epoxy resin has at least two epoxy groups in each molecule.

3. The epoxy resin composition according to claim 1, wherein the at least one glycidyl ether epoxy resin has a chlorine ion content of not more than 10 ppm.

4. The epoxy resin composition according to claim 1, wherein the at least one glycidyl ether epoxy resin has a hydrolyzable chlorine content of not more than 0.1% by weight.

5. The epoxy resin composition according to claim 1, wherein the styrene polymer comprises a polymer selected from the group consisting of styrene polymer, α-methylstyrene polymer, vinyl toluene polymer, divinylbenzene polymer and t-butylstyrene polymer.

6. The epoxy resin composition according to claim 1, wherein the aliphatic polymer block comprises a polymer block selected from the group consisting of butadiene, isoprene and ethylene-butylene.

7. The epoxy resin composition according to claim 1, wherein the at least one styrene block copolymer has a taper structure.

8. The epoxy resin composition according to claim 1, wherein the at least one styrene block copolymer is selected from the group consisting of linear block copolymers, star block copolymers, and double star block copolymers.

9. The epoxy resin composition according to claim 1, wherein the at least one styrene block copolymer is selected from the group consisting of styrene-butadiene block copolymer, styrene-ethylene butylene block copolymer and styrene-isoprene block copolymer.

10. The epoxy resin composition according to claim 1, wherein the at least one styrene block copolymer has an aliphatic polymer block content of from 10-90% by weight.

11. The epoxy resin composition according to claim 1, wherein the at least one styrene block copolymer has an aliphatic polymer block content of from 50–90% by weight.

12. The epoxy resin composition according to claim 1, wherein the at least one hardener comprises a novolak phenolic resin.

13. The epoxy resin composition according to claim 12, wherein the novolak phenolic resin is selected from the group consisting of phenolic novolak resin, cresol novolak resin and tert-butyl phenolic novolak resin.

14. The epoxy resin composition according to claim 12, wherein the novolak phenolic resin has a softening point of 60°–100° C. and a water-soluble component content of not more than 3% by weight.

15. The epoxy resin composition according to claim 1, wherein the at least one hardener comprises a polyhydric phenolic compound selected from the group consisting of resol phenolic resin and bisphenol A.

16. The epoxy resin composition according to claim 1, wherein the at least one hardener comprises an acid anhydride selected from the group consisting of phthalic anhydride, hexahydrophthalic anhydride, tetrahydrophthalic anhydride, pyromellitic anhydride and dodecylsuccinic anhydride.

17. The epoxy resin composition according to claim 1, wherein the at least one inorganic filler is selected from the group consisting of zirconium oxide, alpha quartz, molten silica, clay, alumina, aluminum hydroxide, calcium carbonate, glass, asbestos, whisker, gypsum, magnesite, mica, kaoline, talc, graphite, cement, iron carbonyl, ferrite, molybdenum disulfide, zinc white, titanium white, carbon black, quartz sand and wallastonite.

18. The epoxy resin composition according to claim 17, wherein the at least one inorganic filler comprises a molten silica.

19. The epoxy resin composition according to claim 1, wherein 5–15 parts by weight of the at least one styrene block copolymer per 100 parts by weight of the at least one glycidyl ether epoxy resin is contained in the composition.

20. The epoxy resin composition according to claim 1, wherein the at least one hardener is contained in the composition in an amount sufficient to make the ratio of the number of active groups of the at least one hardener to the number of epoxy groups of the at least one glycidyl ether epoxy resin be in the range of 0.8–1.2.

21. An epoxy resin composition for encapsulating semiconductors, consisting essentially of:
(a) 100 parts by weight of at least one glycidyl ether epoxy resin selected from the group consisting of phenolic novolak epoxy resin and cresol novolak epoxy resin;
(b) 2–20 parts by weight of at least one styrene block copolymer selected from the group consisting of block copolymers formed from styrene polymer and aliphatic polymer block;
(c) 2–30 parts by weight of at least one liquid rubber selected from the group consisting of low molecular weight butadiene polymer, low molecular weight isoprene polymer, liquid chloroprene rubber, liquid silicone rubber and liquid polysulfide rubber;
(d) an amount of at least one hardener selected from the group consisting of phenolic resins, polyhydric phenolic compounds, acid anhydrides and polysulfide resins sufficient to make the ratio of the number of active groups of the at least one hardener to the number of epoxy groups of the at least one glycidyl ether epoxy resin be in the range of 0.5–1.5; and
(e) 60–80% by weight, based on the total weight of the composition, of at least one inorganic filler.

22. The epoxy resin composition according to claim 21, wherein the at least one glycidyl ether epoxy resin has at least two epoxy groups in each molecule.

23. The epoxy resin composition according to claim 21, wherein the at least one glycidyl ether epoxy resin has a chlorine ion content of not more than 10 ppm.

24. The epoxy resin composition according to claim 21, wherein the at least one glycidyl ether epoxy resin has a hydrolyzable chlorine content of not more than 0.1% by weight.

25. The epoxy resin composition according to claim 21, wherein the styrene polymer comprises a polymer selected from the group consisting of styrene polymer, -methylstyrene polymer, vinyl toluene polymer, divinylbenzene polymer and t-butylstyrene polymer.

26. The epoxy resin composition according to claim 21, wherein the aliphatic polymer block comprises a polymer block selected from the group consisting of butadiene, isoprene and ethylene-butylene.

27. The epoxy resin composition according to claim 21, wherein the at least one block copolymer has a taper structure.

28. The epoxy resin composition according to claim 21, wherein the at least one styrene block copolymer is selected from the group consisting of linear block copolymers, star block copolymers, and double star block copolymers.

29. The epoxy resin composition according to claim 21, wherein the at least one styrene block copolymer is selected from the group consisting of styrene-butadiene block copolymer, styrene-ethylene butylene block copolymer and styrene-isoprene block copolymer.

30. The epoxy resin composition according to claim 21, wherein the at least one styrene block copolymer has an aliphatic polymer block content of from 10–90% by weight.

31. The epoxy resin composition according to claim 21, wherein the at least one styrene block copolymer has an aliphatic polymer block content of from 50–90% by weight.

32. The epoxy resin composition according to claim 21, wherein the low molecular weight butadiene polymer is selected from the group consisting of low molecular weight 1,2-polybutadiene, 1,3-polybutadiene, 1,4-polybutadiene, butadiene-styrene copolymer and butadiene-acrylonitrile copolymer.

33. The epoxy resin composition according to claim 21, wherein the low molecular weight isoprene polymer is selected from the group consisting of low molecular weight polyisoprene and low molecular weight depolymerized rubber of natural rubber.

34. The epoxy resin composition according to claim 21, wherein the at least one liquid rubber has on its ends at least one reactive group selected from the group consisting of epoxy, hydroxyl, amino, thiol, carboxyl and vinyl.

35. The epoxy resin composition according to claim 21, wherein the at least one liquid rubber is selected from the group consisting of end carboxyl butadiene-acrylonitrile copolymer, end epoxidized 1,4-polybutadiene and end carboxyl 1,2-polybutadiene.

36. The epoxy resin composition according to claim 21, wherein the at least one hardener comprises a novolak phenolic resin.

37. The epoxy resin composition according to claim 36, wherein the novolak phenolic resin is selected from the group consisting of phenolic novolak resin, cresol novolak resin and tert-butyl phenolic novolak resin.

38. The epoxy resin composition according to claim 36, wherein the novolak phenolic resin has a softening point of 60°–100° C. and a water-soluble component content of not more than 3% by weight.

39. The epoxy resin composition according to claim 21, wherein the at least one hardener comprises a polyhydric phenolic compound selected from the group consisting of resol phenolic resin and bisphenol A.

40. The epoxy resin composition according to claim 21, wherein the at least one hardener comprises an acid anhydride selected from the group consisting of phthalic anhydride, hexahydrophthalic anhydride, tetrahydrophthalic anhydride, pyromellitic anhydride and dodecylsuccinic anhydride.

41. The epoxy resin composition according to claim 21, wherein the at least one inorganic filler is selected from the group consisting of zirconium oxide, alpha quartz, molten silica, clay, alumina, aluminum hydroxide, calcium carbonate, glass, asbestos, whisker, gypsum, magnesite, mica, kaoline, talc, graphite, cement, iron carbonyl, ferrite, molybdenum disulfide, zinc white, titanium white, carbon black, quartz sand and wallastonite.

42. The epoxy resin composition according to claim 41, wherein the at least one inorganic filler comprises a molten silica.

43. The epoxy resin composition according to claim 21, wherein the total amount of the at least one styrene block copolymer and the at least one liquid rubber contained in the composition is from 5–40 parts by weight per 100 parts by weight of the at least one glycidyl ether epoxy resin.

44. The epoxy resin composition according to claim 21, wherein the at least one liquid rubber is contained in the composition in an amount of 5–20 parts by weight per 100 parts by weight of the at least one glycidyl ether epoxy resin.

45. The epoxy resin composition according to claim 21, wherein the at least one styrene block copolymer is contained in the composition in an amount of 5–15 parts by weight per 100 parts by weight of the at least one glycidyl ether epoxy resin.

46. The epoxy resin composition according to claim 21, wherein the at least one styrene block copolymer and the at least one liquid rubber are contained in the composition in amounts of 5–15 parts by weight and 5–20 parts by weight per 100 parts by weight of the at least one glycidyl ether epoxy resin, respectively.

47. The epoxy resin composition according to claim 21, wherein the at least one hardener is contained in the composition in an amount sufficient to make the ratio of the number of active groups of the at least one hardener to the number of epoxy groups of the at least one glycidyl ether epoxy resin to be in the range of 0.8–1.2.

* * * * *